Jan. 26, 1965   A. G. SAVIN   3,167,357
HUB AND BEARING ASSEMBLY FOR TRAILERS
Filed Oct. 3, 1963

INVENTOR.
ALLEN G. SAVIN
BY
ATTORNEY

United States Patent Office 3,167,357
Patented Jan. 26, 1965

3,167,357
HUB AND BEARING ASSEMBLY FOR TRAILERS
Allen G. Savin, 3714 Riedham Road, Shaker Heights,
Cleveland, Ohio
Filed Oct. 3, 1963, Ser. No. 313,637
5 Claims. (Cl. 301—1)

My invention is an improvement in wheel hub and bearing assemblies and relates more particularly to such installations particularly suitable for boat, camping and agricultural trailer wheels.

Heretofore it has been my observation that trailers such as boat trailers or camping trailers equipped with supporting wheels and which are adapted to be towed behind a self-propelled vehicle are mounted on spaced bearings comprising an inner bearing and an outer bearing and the entire wheel and bearing assembly is supported on the vehicle axle. In this type of arrangement there are inherent disadvantages due to the use of inner and outer bearings arranged side by side in the wheel hub, such disadvantages including the necessity for exercising extreme care in properly adjusting each of the bearings in the wheel hub and on the axle when being installed, the inability of the wheel and its tire to properly track when the trailer is drawn over a rough or uneven surface, the inability to prevent water, sand, salt or the like from contacting the lubricant within the bearing, and other disadvantages, all of which are easily overcome by the present invention, and it is, therefore, an object of this invention to eliminate these disadvantages by providing a unique structure for such purpose.

It is an important object of this invention to provide a wheel hub and bearing assembly of extremely simple construction comprising a single ball bearing unit removably secured to a wheel hub and by which it is unnecessary to remove the bearing from the hub in mounting and dismounting the bearing and hub assembly on the axle shaft.

Another object of this invention is to eliminate the necessity for bearing adjustment relative to another bearing in assembling and disassembling the hub on the axle shaft.

A further object of the invention is to provide an effective seal against the admission of water or foreign matter such as salt, sand or the like into the interior of the bearing thereby preventing corruption of the lubricant in the interior of the bearing, while permitting excretion of used lubricant from the bearing and past the seals when fresh lubricant is injected into the bearing through a fitting under pressure.

Still another object of the invention is a trailer wheel comprising a hub and bearing assembly in which the bearing outer race housing is directly mounted on the wheel hub and which may readily be dismounted therefrom by the removal of bolts connecting the same without removing the bearing from the axle shaft, or the bearing and hub assembly as a unit and without previous adjustment may be removed from and assembled on the axle shaft by means of a jam nut and suitable washers carried on the outer end of the axle shaft.

A further object of this invention is to provide better tracking of the trailer equipped with this invention by preventing the so-called "bucking" action frequently encountered in the towing of trailers having conventional wheel and bearing assemblies in which opposed bearings are employed on opposite sides of the wheel hub.

Still another object of this invention is to insure better tracking of the trailer in which the tires and wheels more easily accommodate themselves to rough and uneven road surfaces by permitting only limited radial, axial and angular movement of the wheel hub and tire assembly such as is provided by employing a single ball bearing unit to rotatably support the wheel on the axle shaft.

Still another object of the invention is to insure self-alignment of the trailer with the vehicle towing it.

Other objects and advantages of this invention will become more apparent as the following description of an embodiment thereof progresses, reference being made to the accompanying drawing in which like reference characters are employed to designate like parts throughout the same.

In carrying out my invention, I have shown the same as comprising a single ball bearing and hub assembly mounted on a trailer axle and wheel rim to support the latter in proper alignment with the axis of rotation whereby to provide better tracking characteristics in use.

Figure 1:
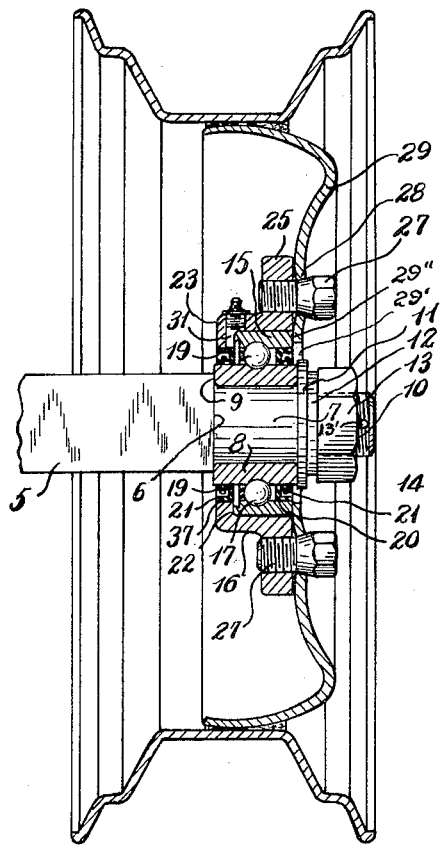
FIGURE 1 is a vertical central section taken in the direction of line 1—1 of FIGURE 2 through a hub and bearing assembly shown mounted on a trailer axle shaft.
Figure 2:
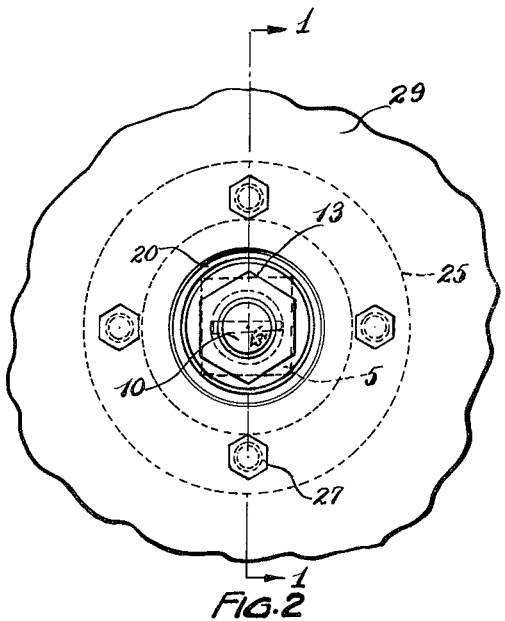
FIGURE 2 is a fragmentary front elevation of the hub and bearing assembly.
Figure 3:
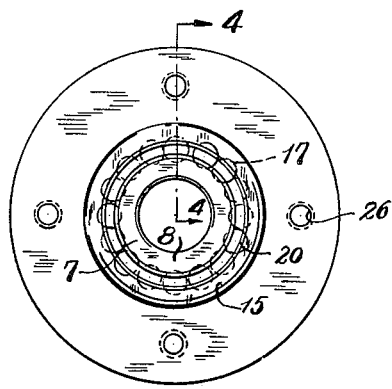
FIGURE 3 is a rear elevation of the bearing assembly as it appears from the left in FIGURE 1.

Referring to the drawing and particularly FIGURE 1 thereof which is illustrative of an embodimment of my invention, a trailer axle shaft is indicated at 5 terminating at its outer end in an annular shoulder 6 and a bearing assembly supporting stub 7. Although I have shown a single axle application of the invention, it is to be understood that the same construction is employed in association with each wheel of the trailer.

The bearing and hub assembly which will be described more fully hereinafter and which includes an inner race member 8 is adapted to be telescoped over the axle stub 7 so that its inner circumferential end 9 abuts the shoulder 6. The stub is, of course, of reduced diameter with respect to that of the shoulder, and terminates in a threaded end 10 for receiving the flat washer 11, the lock washer 12 and the nut 13. A hole 13' may be provided in the shaft as shown to receive a cotter pin for preventing accidental removal of the nut 13. The washer 11 is of a diameter sufficiently large to overlie the inner race outer diameter and is brought into tight engagement with the outer end 14 of the race 8 by turning the nut 13 home tightly against the lock washer and flat washer.

In addition to the inner race 8, the bearing and hub assembly may be described as also including an outer race 15, a hub 16 embracing the bearing outer race, balls 17, a ball retainer and spacer ring 18, bearing seals 19 and 20 and seal retainer means 21.

More specifically, the inner and outer races are grooved to rotatably accommodate the balls 17 therebetween so that smooth relative rotation between the races may be maintained substantially free of the effects of axial, radial and angular stresses such as occur particularly when the trailer traverses uneven and rough terrain.

The outer race 15 preferably is press fitted within the hub, or at least has a tight fit therein, its inner end 22 abutting against the inner surface of the circumferentially inwardly disposed flange 23 of the hub. The hub has a cylindrical portion 24 within which the outer race member is housed and is also provided with an outwardly extending circumferential flange 25 having a plurality of threaded openings 26 circumferentially spaced therearound to receive the bolts 27 operating in aligned openings 28 in the wheel 29 and by which the bearing and hub assembly is removably secured to the wheel.

The hub 16 is provided with a lubricant fitting 30 by which a grease lubricant may be injected by way of the opening 31 into the interior of the bearing and the space between the races and in contact with the balls. This opening overlies the annular relieved portion 32 at the inner side of the outer race.

Figure 4:
FIGURE 4 is an enlarged fragmentary section taken on line 4—4 of FIGURE 3.

Annular seal rings 19 and 20, respectively, preferably of semi-rigid material such as neoprene, each having an annular outwardly opening channel 33 separating outer relatively thick circumferential and radially disposed annular walls 34 and 35, respectively, and an annular wiper wall 36 integral with the wall 35 but which is of relatively lighter and thinner construction and thus possesses greater resiliency and flexibility than the walls 34 and 35, are in sealing contact with the outer surface of the inner race 8. The walls 36 are slightly concave in cross section, as illustrated in FIGURE 4. To insure such sealing contact, I provide seal retainers 21 preferably in the form of continuous resilient coiled springs located in the channels 33 and which, due to their resiliency and when under tension, contract in the channels 33 and exert inward radial compressive forces annularly along the wiper walls 36 when installed, as in FIGURE 4. The heavier walls 34 bear tightly against the annular end wall 37 of the flange 23 in sealing relation.

As a result of this construction, the sealing rings when in place function effectively to prevent water, salt and sand or other foreign matter from passing into the interior of the bearing. Since the heavy seal walls 34 have a relatively large surface area, tight fitting contact with the inner annular wall of the outer race and the relatively thinner and more flexible wiper wall 36 is maintained in sealed wiping contact with the outer annular surface of the inner race by means of the tensioned rings 21. However, the introduction of clean lubricant through the fitting to the interior of the bearing under pressure in sufficient quantity will drive out used lubricant in the bearing ahead of it by forcing the latter outwardly between the wiper wall 36 and the outer surface of the inner race against which it bears under such pressure as will overcome the tension of the rings 21 seeking normally to hold the walls 36 in such sealed position on the inner race. Such pressure is not sufficient to force the lubricant out of the bearing past the walls 34 and 35.

The web of the wheel 29 is provided with an axial opening 29' through which the outer end of the axle stub 7 extends. The wall defining this opening overlies and is in pressure contact with the outer annular edge of the outer race as at 29" when the bolts or studs 27 are tightened against the wheel web. The inner race 8 is anchored on the stub axle between the shoulder 6 and the overlying washers 11 when the nut 13 is tightened thereagainst.

From the above, it will be seen that the hub and bearing assembly employing my invention provides a simple structure by which it is unnecessary to remove the wheel from the hub as a separate operation, but that the entire assembly of wheel, hub and bearing may be removed from the axle as a unit for replacement or repair by merely removing the cotter pin, the nut 13 and the washers 11 and 12 and slipping the entire assembly off of the axle end.

Furthermore, my invention, by its simplicity of construction eliminates the need for precision bearing adjustment when assembling the wheel on the axle such as must be done where separate inner and outer bearings are employed between the wheel and axle.

By the use of a single bearing and hub assembly as disclosed herein, the ill effects of substantial axial, radial and angular stresses resulting from tire or wheel contact with rough and uneven terrain are substantially eliminated and better tracking of the wheels and tires of the trailer on the surface of the roadway is insured.

I claim:

1. In a trailer wheel hub and bearing assembly for mounting on a trailer axle, a ball bearing comprising inner and outer ball race members, a series of balls having bearing contact with both of said races, a wheel hub formed as an annulus and having a pair of annular radially disposed flanges extending therefrom in opposite directions, a cylindrical portion intermediate the flanges contacting the bearing outer race member and supporting the same therein with said outer race in contact with one of said flanges, means formed in said other flange whereby the assembly may be removably secured directly to a trailer wheel, and means for removably securing the bearing assembly as a unit on a trailer axle.

2. In combination with a trailer wheel hub portion having an opening for the end of a trailer axle on which the wheel is to be mounted, a hub and bearing assembly comprising a ball bearing unit, a hub member housing said bearing and formed with an annular radially outwardly extending portion, an inwardly radially extending portion and an intermediate cylindrical portion connecting said radially extending portions for receiving and housing said ball bearing unit therein, said inwardly extending hub portion overlying one end of the ball bearing outer race to limit axial movement thereof in one direction, means for securing the bearing inner race on the trailer axle, said inner race being of a width appreciably greater than that of the outer race and having engagement at one end with a portion of said axle to limit axial movement thereof in one direction, means on the axle overlying the other end of said inner race to bind the same securely on the axle, the wheel hub portion adjacent the mounting opening annularly overlying said outer race opposite end to secure the same within the hub assembly when the hub and bearing assembly is mounted on the wheel hub portion, and means engageable with the outwardly extending hub portion and with said wheel hub portion for removably securing them together.

3. In combination with an axle having a shoulder inwardly of its wheel supporting end, a trailer wheel having an axially apertured bearing and hub assembly consisting essentially of a ball bearing and a ball bearing housing member formed with an intermediate cylindrical portion, an outwardly extending radially disposed mounting flange, and an inwardly radially disposed annular wall, said flange and wall being integral with the cylindrical portion, said flange and said wheel hub having axially aligned openings, means in said openings for securing the wheel hub and flange together, said wall overlying the ball bearing outer race but spaced annularly from the bearing inner race, said wheel hub portion adjacent its axial aperture overlying said flange and bearing outer race to support the said race in the bearing hub to resist radial, axial and angular forces resulting from traction of the wheel over rough or uneven road surfaces, and mounting means engageable with the bearing inner race to bind the said race against said axle shoulder whereby to secure the bearing on the axle.

4. In combination with an axle having a shoulder inwardly of its wheel supporting end, a trailer wheel having an axially apertured bearing and hub assembly consisting essentially of a ball bearing and a ball bearing housing member formed with an intermediate cylindrical portion, an outwardly extending radially disposed mounting flange, and an inwardly radially disposed annular wall, said flange and wall being integral with the cylindrical portion, said flange and said wheel hub having axially aligned openings, means in said openings for securing the wheel hub and flange together, said wall overlying the ball bearing outer race but spaced annularly from the bearing inner race, said wheel hub portion adjacent its axial aperture overlying said flange and bearing outer race to support the said race in the bearing hub to resist radial, axial and angular forces resulting from traction of the wheel over rough or uneven road surfaces, and mounting means engageable with the bearing inner race to bind the said race against said axle shoulder whereby to secure the bearing on the axle, and sealing means between the ball bearing races comprising spaced apart annularly channeled members opening outwardly on opposite sides of the ball bearing, said channels being formed with a relatively flexible integral inner annular wall, said inner wall normally retaining lubricant within the bearing and responding to external pressures exerted thereagainst in a direction toward the bearing to seal against ingress of matter into the bearing.

5. The subject matter as in claim 2, wherein there is provided sealing means between the ball bearing races, said sealing means comprising spaced apart annularly channeled members opening outwardly on opposite sides of the ball bearing, said channels being formed with a relatively flexible integral inner annular wall, said inner wall normally retaining lubricant within the bearing and responding to external pressures exerted thereagainst in a direction toward the bearing to seal against ingress of matter into the bearing.

References Cited by the Examiner
UNITED STATES PATENTS

| 2,669,878 | 2/54 | Nelson | 308—187.1 X |
| 2,779,639 | 1/57 | Bainbridge | 308—187.1 |

FOREIGN PATENTS

| 485,712 | 11/17 | France. |
| 658,019 | 10/51 | Great Britain. |

ARTHUR L. LA POINT, *Primary Examiner.*